Figure 1:
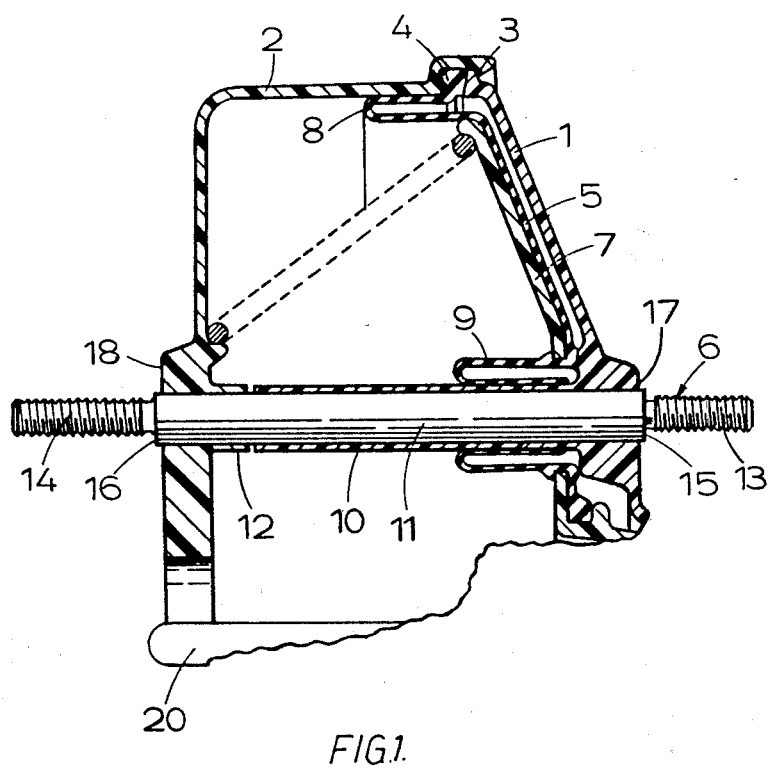

United States Patent [19]

Thomas et al.

[11] 4,271,750
[45] Jun. 9, 1981

[54] SERVO BOOSTERS FOR VEHICLE BRAKING SYSTEMS

[75] Inventors: Alfred W. Thomas, Koblenz; Lutz E. A. op den Camp, Koblenz-Moselweiss, both of Fed. Rep. of Germany

[73] Assignee: Lucas Industries Limited, Birmingham, England

[21] Appl. No.: 55,352

[22] Filed: Jul. 6, 1979

[30] Foreign Application Priority Data

Jul. 8, 1978 [GB] United Kingdom ............... 29255/78

[51] Int. Cl.³ ............................................. F01B 19/00
[52] U.S. Cl. .................................. 92/98 D; 92/165 PR
[58] Field of Search ................... 92/83, 98 D, 165 R, 92/165 PR, 166

[56] References Cited

U.S. PATENT DOCUMENTS

| | | | |
|---|---|---|---|
| 2,369,797 | 2/1945 | Rappl | 92/166 |
| 2,910,047 | 10/1959 | Plummer | 92/166 |
| 2,987,888 | 6/1961 | Crowell | 92/166 |
| 3,312,147 | 4/1967 | Reichard | 60/547 |
| 3,411,409 | 11/1968 | Bunyard | 92/166 |
| 3,537,358 | 11/1970 | Bunyard | 92/166 |
| 3,934,480 | 1/1976 | Nederlof | 92/98 D |

FOREIGN PATENT DOCUMENTS 2255050  5/1974  Fed. Rep. of Germany ...... 92/165 PR

*Primary Examiner*—Abraham Hershkovitz
*Attorney, Agent, or Firm*—Scrivener, Clarke, Scrivener and Johnson

[57] ABSTRACT

In order to reduce the distortion of a servo booster housing in use the booster is provided with one or more ties which extend through the movable wall for transmitting reaction forces directly from the master cylinder housing to the vehicle bulkhead between which the booster is mounted. This enables a housing of lighter weight, such as a plastics housing, to be employed, and an overall saving in weight may be achieved. The front or rear housing wall, or both, is provided with a sleeve which encases part of the tie within the housing. The sleeve may perform various functions: it may be keyed to the tie to resist turning of the tie, it may be arranged to support a rolling diaphragm sealing the tie to the movable wall, and its free end may locate a peripheral bead on the rolling diaphragm.

3 Claims, 2 Drawing Figures

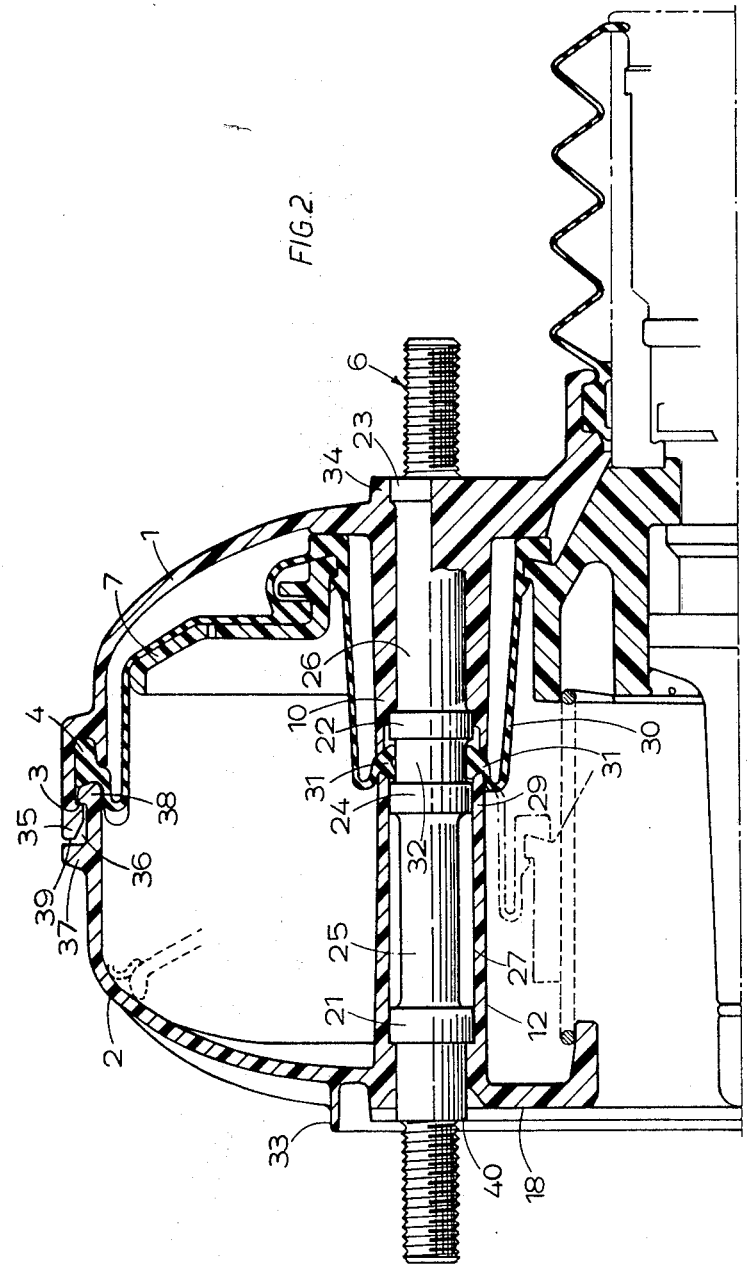

SERVO BOOSTERS FOR VEHICLE BRAKING SYSTEMS

This invention relates to servo boosters for vehicle braking systems.

In order to reduce the distortion of a servo booster housing in use it has been proposed to provide the booster with one or more force transmitting means, such as ties, which extend through the movable wall for transmitting reaction forces directly from the master cylinder housing to the vehicle bulkhead between which the booster is mounted. This enables a housing of lighter weight, such as a plastics housing to be employed, and an overall saving in weight may be achieved.

With such a booster it is, of course, necessary to seal the force transmitting means directly or indirectly to the front and rear booster housing walls and directly or indirectly to the movable wall.

According to the present invention a servo booster assembly for a vehicle braking system comprises a housing, a movable wall dividing the interior of the housing into two chambers and adapted to apply a force to an output member when the chambers are subjected to a pressure differential in response to a force applied to an input member, at least one tie extending through the movable wall from one housing wall to a further housing wall on the opposite side of the movable wall, means sealing the movable wall directly or indirectly to the tie, and a sleeve secured to or integral with said one housing wall and encasing at least part of the tie within the housing.

There are various functions which such a sleeve may perform.

The sleeve may be keyed to the tie over a substantial portion of the length of the tie so as to provide an increased resistance to turning of the tie relative to the housing when the tie is being attached by screwing to a bulkhead or master cylinder housing.

When the housing is formed of moulded plastics the sleeve may be moulded around a non-round portion of the tie to provide the keying. Preferably the tie then has a round but splined portion around which the sleeve is moulded to provide a strong key.

Alternatively the portion of the tie within the sleeve could be of square cross-section, for example, and be slidably received within a moulded square-section bore of the sleeve.

When the seal means between the movable wall and the tie comprises a rolling diaphragm the sleeve is preferably dimensioned to provide a support surface for the rolling diaphragm. This is useful when the tie does not comprise a plain rod, or when the outer surface of the tie is otherwise unsuitable for supporting the diaphragm. A moulded plastics sleeve may readily be provided with an outer surface of high quality for supporting the rolling diaphragm. The sleeve may be provided with circumferentially spaced longitudinally extending ribs to support the rolling diaphragm.

When the seal means between the movable wall and the tie comprises a flexible boot or rolling diaphragm provided with a peripheral bead which seats on the tie, the bead may advantageously be located in position on the tie by the free end of the sleeve.

Preferably both housing walls are provided with sleeves which are directed towards each other, the free ends of the sleeves being spaced apart from each other and adapted to locate the bead.

Since the single bead may be arranged to seal with the ends of both sleeves, and since they may be permanently sealed to the housing walls without the use of resilient seals, no further seals which might require replacement during servicing need be used for sealing the tie to the booster.

In one preferred construction employing such oppositely directed sleeves, the peripheral bead of each rolling diaphragm is of substantially wedge shape in transverse cross-section, increasing in axial thickness in the radially inward direction relative to the axis of the respective tie, and the arrangement is such that the thinnest part of the bead is located between the free ends of the sleeve but without being substantially compressed axially.

When during operation of the booster under high differential pressures the bead is subjected to a radially outward force by the rolling diaphragm the wedge shape of the bead resists outward movement of the bead, and the bead is thus retained in sealing engagement with the sleeve ends, without being subjected under normal conditions to high clamping forces which might result in its early failure.

Preferably the housing comprises opposed housing shells, and said housing walls are walls of the respective shells.

Two embodiments of our invention are illustrated in the accompanying drawings in which:

FIG. 1 is a longitudinal cross-sectional view of the booster of the invention; and FIG. 2 is a view similar to FIG. 1 but showing a modification of the booster.

Two servo booster assemblies in accordance with the invention will now be described, by way of example only, with reference to the two figures of the accompanying drawings which are longitudinal cross-sectional partial views of the boosters.

The servo booster assembly of FIG. 1 comprises moulded plastics housing shells 1 and 2 adapted to have a snap engagement with each other at 3 and to trap therebetween the outer peripheral bead 4, of generally trapezoidal cross-section, of a flexible diaphragm 5. A pair of metal tie rods 6 extend axially through the shells and through a moulded plastics diaphragm support plate 7. The flexible diaphragm 5 together with the plate 7 constitute a movable wall. The tie rods are disposed diametrically opposite to each other, and preferably with their axes equidistant from the axis of an output rod 20. The diaphragm 5 has a main rolling diaphragm portion 8 and a pair of integral rolling diaphragm portions 9 which seal the diaphragm 5 to a first sleeve 10 integral with shell 1 and slidably located on the central portion 11 of the tie rod 6. The outer surface of the first sleeve 10 is smooth to provide a support surface for the rolling diaphragm portion 9. A second sleeve 12 is integral with the shell 1 and has its free end spaced from the free end of the sleeve 10.

The tie rod 6 has threaded, reduced end portions 13 and 14 for connection respectively to a vehicle bulkhead and to a master cylinder housing. Shoulders 15 and 16 on the tie rods project beyond the adjacent outer surfaces 17 and 18 respectively of the housing shells and are adapted to engage with faces of the master cylinder housing and bulk head to locate the master cylinder and booster assembly.

In FIG. 2 parts corresponding to those of FIG. 1 have been given corresponding reference numerals. The booster of FIG. 2 is similar to that of FIG. 1 in that the moulded plastics shells 1 and 2 are provided with integral sleeves 10 and 12 respectively around the tie rods 6, but in this embodiment the sleeves 10 and 12 are of approximately equal length. Each tie rod comprises plain cylindrical enlarged portions 21, 22 and 23, a splined enlarged portion 24, a plain reduced portion 25, and a splined reduced portion 26 of substantial length. Portion 22 and 26 have sleeve 10 moulded around them. Alternatively, portions 22 and 26 can be used to form complementary internal splines on the inner cylindrical surface of sleeve 10 by pressing the ties 6 into position after the moulding of the housing. Since the splined portion 26 is of substantial length the tie rods 6 are held very firmly against rotation relative to shell 1. The sleeve 12 is moulded with a stepped bore, the step 28 of which abuts with the portion 21 to determine the axial spacing of the central portions of the shells 1 and 2 when the central portions 1 and 2 are urged towards each other in use by tightening the tie rods to the master cylinder flange. The end portion 29 is formed with internal splines which may be formed as the splined portion 24 of the rod is pressed into position, the internal splines co-operating with the splines of portion 24 of each tie rod.

Diaphragm 7 is provided with two integral rolling diaphragm portions 30 which terminate in a bead 31 of wedge shape in transverse cross-section, the bead increasing in axial width with reducing diameter, and the bead 31 seats against the base of an annular recess 32 defined between portion 22 and 24 of the tie rod 6. The bead 31 is prevented from being pulled radially out of engagement with the tie rod 6, when the diaphragm is subjected to high pressure differentials, by the free ends of the sleeves 10 and 12 which are spaced axially apart to receive snugly the thinner radially outer portion of bead 31 whilst not exerting sufficient clamping force on the bead which might eventually damage the bead. As shown in the drawing the bead 31 may be provided with an annular recess in the face that engages with the tie rod 6 or the face may be plain. In order to ensure static sealing of the end of sleeves 10 and 12 to each other, and at the same time to avoid excessive axial compression of the radially outer portion of bead 31, which may distort the flexible part of rolling diaphragm 30, it may be necessary to compress bead 31 radially between tie 6 and the sleeves 10 and 12

It should be noted that in addition to sealing the two chambers of the booster from each other the seal 31 also effects a seal between the tie and both housing shells 1 and 2, so that additional seals at the tie ends are not required.

Tie rod 6 adjacent to its front end is formed with a step 40 which is axially displaced from the front surface 18 of housing shell 2. In use the step 40 forms an abutment for the rear end of a master cylinder housing. A forwardly extending skirt 33 is provided on shell 2. In the absence of skirt 33 a gap would be visible between the rear of the master cylinder housing and face 18 and there would be some danger of a mechanic taking this as an indication that the master cylinder housing had not been sufficiently tightly clamped to the booster, which might lead him to overtighten the nuts on the tie rods. The skirt 33 is therefore provided primarily to hide from view the gap between the master cylinder housing and the shell 2.

If desired, the skirt 33 can be so shaped to form an interference fit with the outer periphery of the flange of a master cylinder housing which, when clamped into position as previously described, will be supported against side loads by said skirt.

Rear housing shell 1 is formed with integral rearwardly directed annular sealing lips 34 co-axial with respective tie bars 6. Lips 34 are part-flexible and effect seals with the vehicle bulkhead to prevent engine compartment fumes entering the booster around the rear end of the tie bars. This avoids the need for separate gaskets.

In the embodiment of FIG. 2 the snap engagment at 3 between the radially outer peripheries of the housing shells 1 and 2 is effected by a radial inwardly directed annular lip 35 which is received with axial clearance within a radially outwardly facing annular recess 36 defined between axially spaced outwardly directed annular projections 37 and 38 on shell 2. The free end 39 of the lip 35 and the projection 37 limit the axial movement of the peripheries of the shells 1 and 2 towards each other under vacuum forces and thus limit the maximum clamping force applied by the shells to the bead 4.

We claim:

1. A servo booster assembly for a vehicle braking system comprising a housing, an input member, an output member, a movable wall dividing the interior of the housing into two chambers and adapted to apply a force to said output member when the chambers are subjected to a pressure differential in response to a force applied to said input member, a flexible diaphragm and a diaphragm support plate of said movable wall, first and second housing walls of said housing on opposite sides of said movable wall, at least on tie extending through said diaphragm support plate from said first housing wall to said second housing wall, a rolling diaphragm sealing said movable wall to said tie, and a sleeve connected to said first housing wall and encasing at least part of said tie within said housing, a radially outer surface of said sleeve being arranged to support said rolling diaphragm.

2. A servo booster assembly for a vehicle braking system comprising a housing, an input member, an output member, a movable wall dividing the interior of the housing into two chambers and adapted to apply a force to said output member when the chambers are subjected to a pressure differential in response to a force applied to said input member, first and second housing walls of said housing on opposite sides of said movable wall, at least one tie extending through said movable wall from said first housing wall to said second housing wall, a rolling diaphragm sealing said movable wall to said tie, a peripheral bead of said rolling diaphragm, a first sleeve connected to said first housing wall and encasing a part of said tie within said second housing, and a second sleeve connected to said second housing wall and encasing a further part of said tie within said housing, opposed free ends of said first and second sleeves being axially spaced apart and locating said peripheral bead.

3. A servo booster as claimed in claim 2 wherein said peripheral bead is of substantially wedge shape in transverse cross-section, increasing in axial thickness in the radially inward direction relative to the axis of said tie, and the arrangement is such that the thinnest part of the bead is located between said free ends but without being substantially compressed axially.

* * * * *